United States Patent
Mendes da Silva et al.

(10) Patent No.: US 11,063,702 B2
(45) Date of Patent: *Jul. 13, 2021

(54) REDUNDANCY IN CONVERGED NETWORKS

(71) Applicant: International Business Machines Corporation, Armonk, NY (US)

(72) Inventors: Raphael P. Mendes da Silva, Campinas (BR); Desnes A. Nunes do Rosário, Sao Paulo (BR); Jose F. Santiago Filho, Campinas (BR)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/294,504

(22) Filed: Mar. 6, 2019

(65) Prior Publication Data

US 2019/0207715 A1   Jul. 4, 2019

Related U.S. Application Data

(63) Continuation of application No. 15/267,340, filed on Sep. 16, 2016, now Pat. No. 10,333,652.

(51) Int. Cl.
  *H04L 1/08*   (2006.01)
  *H04L 1/22*   (2006.01)
  *H04L 12/24*  (2006.01)

(52) U.S. Cl.
  CPC .............. *H04L 1/08* (2013.01); *H04L 1/22* (2013.01); *H04L 41/06* (2013.01)

(58) Field of Classification Search
  None
  See application file for complete search history.

(56) References Cited

U.S. PATENT DOCUMENTS

| | | |
|---|---|---|
| 6,856,619 B1 | 2/2005 | Haugseth et al. |
| 7,944,812 B2 | 5/2011 | Carlson et al. |
| 8,446,817 B2 | 5/2013 | Stine et al. |
| 8,625,416 B2 | 1/2014 | Vallala et al. |
| 2006/0218267 A1 | 9/2006 | Khan et al. |
| 2007/0076590 A1 | 4/2007 | Galpin et al. |

(Continued)

OTHER PUBLICATIONS

Araujo et al., "High Availability Automation Networks: PRP and HSR Ring Implementations," http://ieeexplore.ieee.org/stamp/stamp.jsp?tp=&arnumber=6237259, pp. 1197-1202, © 2012 IEEE.

(Continued)

*Primary Examiner* — Kouroush Mohebbi
(74) *Attorney, Agent, or Firm* — Jared L. Montanaro

(57) ABSTRACT

A second node may receive a first duplicate package through a converged network via a first node. The first node my include a first link redundancy entity and the second node may include a second link redundancy entity. The first link redundancy entity and the second link redundancy entity may be a part of a physical layer. The second node may receive a second duplicate package. The second link redundancy entity may determine that the first duplicate package was received before the second duplicate package. The second node may delete the second duplicate package. The second node may send the first duplicate package to an application.

20 Claims, 8 Drawing Sheets

(56) References Cited

U.S. PATENT DOCUMENTS

| | | |
|---|---|---|
| 2014/0050225 A1 | 2/2014 | Kuo et al. |
| 2014/0105033 A1* | 4/2014 | Vasseur .................. H04L 45/24 370/248 |
| 2014/0280752 A1 | 9/2014 | Seastrom et al. |
| 2016/0056974 A1 | 2/2016 | Sotiropoulos et al. |
| 2018/0083737 A1 | 3/2018 | Mendes da Silva et al. |

OTHER PUBLICATIONS

Brocade, "A New Class of Server I/O Consolidation," Brocade 1020 CNA, http://i.dell.com/sites/doccontent/shared-content/data-sheets/en/Documents/switch-brocade-1020-specsheet.pdf, 2 pgs, © 2012 Brocade Communications Systems, Inc.

Brocade, "FCOE Multipathing and LAG," https://community.brocade.com/dtscp75322/attachments/dtscp75322/ethernet/1203/1/FCoE%20Multipathing%20and%20LAG_Oct2013.pdf, 10 pgs., May, 2013, © 2013 Brocade Communications Systems, Inc.

Cisco, "Fibre Channel over Ethernet Operations," http://www.cisco.com/c/en/us/td/docs/switches/datacenter/nexus5000/sw/operations/n5k_fcoe_ops.html#55248, 36 pgs., updated Jul. 1, 2011, printed Jun. 29, 2016.

IEEE, "IEEE Std. 802.3-2015,", IEEE Standard for Ethernet, Section One, http://ieeexplore.ieee.org/stamp/stamp.jsp?tp=&arnumber=7428776&tag=1, p. 112, © 2016 IEEE.

Information Technology Industry Council, "Fibre Channel—Fibre Channel Backbone—5 (FC-BB-5) Rev. 2.00," 180 pgs., Jun. 4, 2009.

Information Sciences Institute, University of Southern California, "Internet Protocol, DARPA Internet Program, Protocol Specification," https://tools.ietf.org/html/rfc791, 50 pgs., Sep. 1981.

Rentschler et al., "The Parallel Redundancy Protocol for Industrial IP Networks," http://ieeexplore.ieee.org/stamp/stamp.jsp?tp=&arnumber=6505877, pp. 1404-1409, © 2013 IEEE.

Tien, et al., "Developing a New HSR Switching Node (SwitchBox) for Improving Traffic Performance in HSR Networks," www.mdpi.com/journal/energies, pp. 1-24, Energies, 2016.

Winter et al., "Ethernet Jumbo Frames," Ethernet Alliance, http://www.ethernetalliance.org/wp-content/uploads/2011/10/EA-Ethernet-Jumbo-Frames-v0-1.pdf, 10 pgs., Nov. 12, 2009.

VMware, "Best Practices Guide: Network Convergence with Emulex LP21000 CNA & VMware ESX Server; How to deploy Converged Networking with VMware ESX Server 3.5 Using Emulex FCoE Technology," http://www.vmware.com/files/pdf/Converged_Networking_with_Emulex_FCoE_Adapters_and_VMware_ESX_v15.pdf, pp. 1-19, printed Jun. 29, 2016.

Wikipedia, "Converged network adapter," http://en.wikipedia.org/wiki/Converged_network_adapter, 3 pgs., printed Jun. 29, 2016.

Unknown, "Parallel Redundancy Protocol (PRP)," https://wiki.wireshark.org/PRP, printed Sep. 15, 2016, 6 pgs.

List of IBM Patents or Patent Applications Treated as Related, Mar. 6, 2019, 2 pgs.

* cited by examiner

REDUNDANCY IN CONVERGED NETWORKS

BACKGROUND

The present disclosure relates generally to the field of network redundancy, and more specifically to having zero time recovery for converged networks due to redundancy.

Two or more converged networks may logically be combined on each converged networks' respective physical layer so that a computer system may identify one communication stack from the two or more converged networks. An information package may be sent through one of the two or more converged networks and the information package may be duplicated and redundantly sent through at least two of the two or more converged networks. The computer system may identify the redundancy and without interference to the processing power or timing of the computer system, delete all but one of the duplicate, redundant packages.

SUMMARY

Embodiments of the present disclosure include a method, computer program product, and system for having zero time recovery for converged networks due to redundancy. A second node may receive a first duplicate package through a converged network via a first node. The first node my include a first link redundancy entity and the second node may include a second link redundancy entity. The first link redundancy entity and the second link redundancy entity may be a part of a physical layer. The second node may receive a second duplicate package. The second link redundancy entity may determine that the first duplicate package was received before the second duplicate package. The second node may delete the second duplicate package. The second node may send the first duplicate package to an application.

Some embodiments of the present disclosure may include a redundancy converged network adapter (RCNA) configured to perform operations. The RCNA may duplicate a package received from a first node to be sent to a second node. The first node may include a first link redundancy entity and the second node may include a second link redundancy entity. The first link redundancy entity and the second link redundancy entity may be a part of a physical layer. The RCNA may transmit, from the first node, a first duplicate package through a converged network to the second node. The RCNA may also transmit, from the first node, a second duplicate package to the second node. The RCNA may determine, by the second link redundancy entity, that the first duplicate package was received before the second duplicate package. The RCNA may delete the second duplicate package from the second node.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
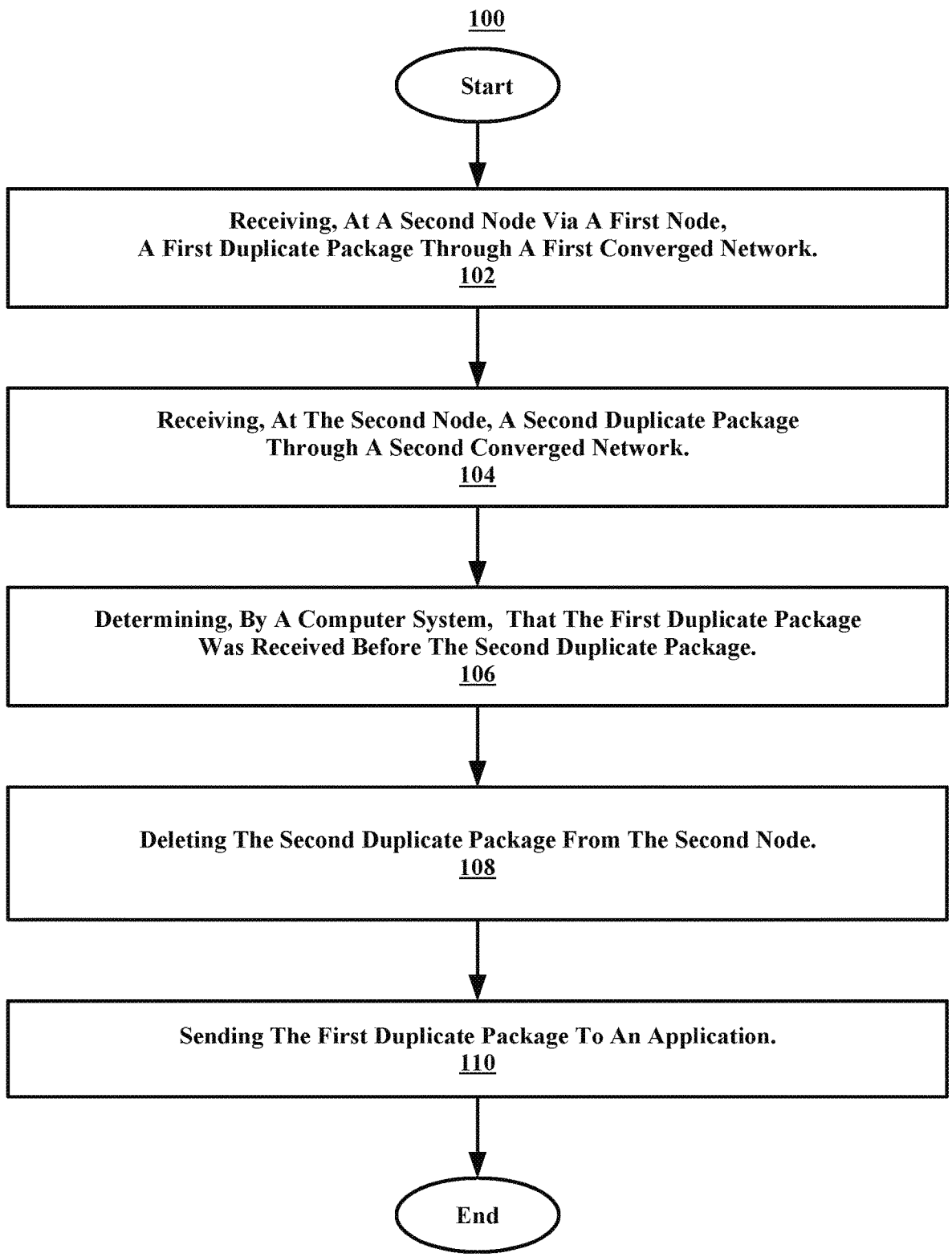
FIG. 1 illustrates a flowchart of an example method for deleting redundant packages received from two or more converged networks, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of present disclosure relate generally to the field of network redundancy, and more specifically to having zero time recovery for converged networks due to redundancy (e.g., the same information packages being transmitted to the same destination). While the present disclosure is not necessarily limited to such applications, various aspects of the disclosure may be appreciated through a discussion of various examples using this context.

Two or more converged networks may be physically connected together and may be seen by a computer system as a single logical network (e.g., the converged networks share the same MAC address). Duplicate information packages (e.g., Ethernet packets), may simultaneously be sent through the two or more converged networks creating redundancies. The computer system may lose processing capability and speed while determining which duplicate information package to keep and which package(s) to delete. In some embodiments, a converged network may be a combination of converged datacenters that may be using Ethernet technology to promote a single network for regular (e.g., informational) data and storage data transport. In some embodiments, the converged network may be enabled to transport both regular data and storage data through the single network through the use of Fibre Channel over Ethernet (FCoE).

In some embodiments, a second node, via a first node, may receive a first duplicate package through a first converged network. In some embodiments, the first and second nodes may be physically connected to two or more converged networks. The second node may also receive a second duplicate package through a second converged network. The second node may determine that the first duplicate package was received before the second duplicate package. The second node may delete the second duplicate package from the second node. The second node may also send the first duplicate package to an application. In some embodiments, the first and second nodes may each include a link redundancy entity (LRE) configured to induce the first and second nodes to perform the functions aforementioned and hereinafter recited.

For example, a computer system (e.g., first node) may transmit (e.g., send, etc.) a package of information to a storage module (e.g., second node) that may include a link redundancy entity (LRE) and the storage module may be connected to two converged networks. The computer system before transmitting the package of information may duplicate the package of information into first and second duplicate packages, one duplicate package for each converged network. The computer system may transmit both duplicate packages through each converged network and the storage module may receive the first and second duplicate packages. The LRE of the storage module may determine that the first duplicate package arrived through the first converged network before the second duplicate package arrived through the second converged network. The LRE of the storage module may then delete the second duplicate (e.g., redundant) package and send the first duplicate package to an application stored in the storage module. In some embodiments, a user may wish to have a redundant, converged network to ensure that information is transmitted regardless of physical (e.g., cable, wire, etc.) failure in one or more networks included in the converged network. In some embodiments, the first node may be the node performing the operations aforementioned.

In some embodiments, the first converged network and the second converged network may be connected to the first and second nodes on a lower layer (e.g., physical layer, etc.). For example, a first converged network and a second converged network may each be connected to a server and a storage unit via Ethernet cables (e.g., the first converged network, second converged network, server, and storage unit may each have Ethernet ports). In some embodiments, the first and second converged networks may be connected by any number of physically allowable mediums (e.g., cords, cables, tape, etc.). In some embodiments, the first and second converged networks may include any number of ports that may support Ethernet (e.g., USB to Ethernet adapter, HDMI with Ethernet, etc.).

In some embodiments, the second duplicate package may be a copy of the first duplicate package. In some embodiments, the second node may generate a database table. The second node, at a first time, may add the first duplicate package identified at the first to the database table. The second node may identify, at a second time, that the first duplicate package is in the database table and delete, at the second time, the second duplicate package. In some embodiments, a source media access control (SRC MAC) address associated with the first duplicate package may be added to the database table. In some embodiments, an identifier associated with the first duplicate package may be added to the database table.

For example, a server that may include and LRE may receive two copies of the same Ethernet packet. The LRE of the server may generate a database table and following an asynchronous timer check the first converged network at a first time. The LRE of the server may add the first copy of the Ethernet packet (e.g., received through the first converged network) to the database table. The LRE of the sever may then, following the asynchronous timer, check the second converged network at a second time and identify the second Ethernet packet. The LRE of the sever may scan the database table at the second time and identify that the second Ethernet packet is a copy of the first Ethernet packet already in the database table. The LRE of the server may delete the second Ethernet packet at the second time. In some embodiments, the second duplicate package is deleted with zero interference (e.g., zero time interference, negligible time interference, processing interference, etc.) to the server. In some embodiments, the LRE may be an application specific integrated circuit (ASIC) or a field programmable gate array (FPGA) programmed to perform the functions detailed above.

In some embodiments, a fourth duplicate package may be a copy of a third duplicate package. In some embodiments, the second node may generate a database table. The second node may add, at a third time, the third duplicate package received by the second node through a third converged network. The second node may identify, at a fourth time, that the fourth duplicate package was not received by the second node through a fourth converged network. The second node may alert a user to an error in a physical component of the fourth converged network.

For example, a third converged network disjoined from a fourth converged network may be connected to one another through a redundant converged network adapter (RCNA) that may be a part of a server (e.g., first node) and a storage module (e.g., second node). In some embodiments, the RCNA may include an LRE configured to perform the functions of the RCNA. The storage module may include a database table that may store each package non-redundant (e.g., the first duplicate package) received through the third and fourth converged networks. The storage module may add a third duplicate package, at a third time, to the database table and may logically identify from the RCNA that a fourth duplicate package is to be received. The storage module may identify at a fourth time that the fourth duplicate package did not arrive. The storage module may alert a user to a defect in the fourth converged network (e.g., a display screen may state that the Ethernet cable connecting the fourth converged network is damaged). In some embodiments, the third duplicate package may not be received and the user may be alerted to damage to a physical component of the third converged network. In some embodiments, the second node may be programmed to wait a particular period of time (e.g., 1 nanosecond, 1 second, etc.) before identifying that a fourth duplicate package is not received.

In some embodiments, the second node may generate a confirmation package. In some embodiments, the confirmation package may include a confirmation report indicating whether or not both the third duplicate package and fourth duplicate package were received by the second node. The second node may duplicate the confirmation package into a fifth duplicate package and a sixth duplicate package. The second node may transmit the fifth duplicate package through a fifth converged network to the first node. The second node may also transmit the sixth duplicate package through a sixth converged network to the first node. In some embodiments, an RCNA configured to logically implement one communication stack for two or more converged networks may transmit the fifth duplicate package and the sixth duplicate package.

For example, a storage module may receive two duplicate Ethernet packets from a server. The storage module may generate a confirmation report indicating that both duplicate Ethernet packets were received. The storage module may duplicate the confirmation report (e.g., into the fifth and sixth duplicate package) and transmit the confirmation reports through two converged networks (e.g., the fifth and sixth converged networks) to the sever. In some embodiments, the terms first, second, third, fourth, fifth, sixth, etc. may be interchangeable (e.g., first node may be fourth node, fifth converged network may be third converged network, etc.) and/or include more numeral indicators (e.g., eighth, hundredth, etc.).

In some embodiments, the first node may identify in the confirmation report that the fourth duplicate package did not reach the second node. The first node may alert a user to an error in a physical component of the fourth converged network. Following the above example, the confirmation report may indicate that the one of the duplicate Ethernet packets did not reach the storage module. The storage module may send the confirmation report to the server and the server may identify in the confirmation report that one of the duplicate Ethernet packets did not reach the storage module. The server may alert the user with a signal (e.g., such as a sound, a display, etc.) that a physical component of one of the converged networks used to transmit the duplicate Ethernet packets is damaged.

In some embodiments, the first node may receive, via the second node, the fifth duplicate package through the fifth converged network. The first node may also receive the sixth duplicate package through the sixth converged network. The first node may determine that the fifth duplicate package was received before the sixth duplicate package. The first node may delete the sixth duplicate package. The first node may also send the fifth duplicate package to an application.

In some embodiments, an RCNA including an LRE may be configured to duplicate a package received from a first node to be sent to a second node. In some embodiments, the first node and the second node may be physically connected to two or more converged networks. The RCNA may transmit, from the first node, a first duplicate package through a first converged network to the second node. The RCNA may transmit, from the first node a second duplicate package through a second converged network to the second node. The RCNA may also receive, by the first node, a third duplicate package through a third converged network. The RCNA may receive, by the first node, a fourth duplicate package through a fourth converged network. The RCNA may determine whether the first duplicate package was received before the second duplicate package. The RCNA may delete the second duplicate package from the end node. In some embodiments, the RCNA may include control logic configured to logically implement one communication stack for the two or more converged networks.

In some embodiments, when the RCNA duplicates the package received from the first node, the RCNA may generate an identifier for the package. The RCNA may tag the package with the identifier and the RCNA may duplicate the package with the identifier. For example, the RCNA may prime an Ethernet packet for transmission to second node by generating the identifier "XXYY." The RCNA may tag the Ethernet packet with the identifier "XXYY" and then the RCNA may duplicate the package with the identifier (e.g., the Ethernet packet and the identifier are both duplicated). In some embodiments, the identifier may be a suffix used to identify a redundant package in an LRE and may be up to 2 bytes in size.

In some embodiments, when transmitting the first duplicate package and the second duplicate package, the RCNA may simultaneously (e.g., in a time negligibly indistinguishable from simultaneous, within a picosecond, etc.) send the first duplicate package through the first converged network and the second package through the second converged network.

In some embodiments, the third duplicate package and the fourth duplicate package are copies of a confirmation package that includes a confirmation report. In some embodiments, the RCNA, may determine whether the first duplicate package was received before the second duplicate package by identifying, at a first time, that the first duplicate package was received by the second node. The RCNA may also identify, at a second time, that the second duplicate package was received by the second node. In some embodiments, the second time may be subsequent the first time. In some embodiments, the RCNA may include an LRE configured to perform the functions of the RCNA.

The RCNA may compare the first duplicate package identified at the first time to the second duplicate package identified at the second time. The RCNA may generate the confirmation package with the confirmation report in the second node. The RCNA may duplicate the confirmation package to generate the third duplicate package and the fourth duplicate package. The RCNA may transmit, from the second node, the third duplicate package and the fourth duplicate package to the first node.

In some embodiments, the second duplicate package may be a copy of the first duplicate package. In some embodiments, the RCNA may compare the first duplicate package identified at the first time to the second duplicate package identified at the second time by generating a database table. The RCNA may add, at the first time, the first duplicate package identified at the first time to the database table. The RCNA may identify, at the second time, that the first duplicate package is in the database table and delete, at the second time, the second duplicate package.

In some embodiments, the RCNA may generate a database table. The RCNA may add to the database table, at the first time, a fifth duplicate package identified at the first time as arriving in the second node through a fifth converged network. The RCNA may identify, at the second time, that a sixth duplicate package did not arrive in the second node through a sixth converged network. The RCNA may alert a user to an error in a physical component of the sixth converged network.

In some embodiments, the RCNA may be configured to handle both redundant packages (e.g., packages initiated in the physically connected two or more converged networks) and standard packages (e.g., packages initiated outside the physically connected two or more converged networks). For example, a storage module may receive a package from a server outside of a converged network that the storage module is connected to. The RCNA may process the package and send the package to an application for use by a user. The RCNA may process the package received from the outside server without duplicating the package for confirmation of receipt (e.g., because the package was received by the storage module).

Referring now to FIG. 1, which illustrates a flowchart of an example method 100 for deleting redundant packages received from two or more converged networks, in accordance with embodiments of the present disclosure. A computer system (e.g., first node, second node, end node, receiver, sender, etc.) may perform one or more operations in the method 100. In some embodiments, a user may perform one or more operations in the method 100. In some embodiments, the processor may perform one or more operations in the method 100 in response to user input. In some embodiments, the method 100 may begin at operation 102 where a second node may receive, via a first node, a first duplicate package through a first converged network.

After receiving a first duplicate package through the first converged network at operation 102, the method 100 may proceed to operation 104. At operation 104, the second node may receive a second duplicate package through a second converged network. After receiving a second duplicate package through a second converged network at operation 104, the method 100 may proceed to operation 106. At operation 106, the second node may determine that the first duplicate package was received before the second duplicate package.

After determining that the first duplicate package was received before the second duplicate package at operation 106, the method 100 may proceed to operation 108. At operation 108, the second node may delete the second duplicate package (from itself). After deleting the second duplicate package from the second node at operation 108, the method 100 may proceed to operation 110. At operation 110, the second node may send the first duplicate package to an application.

For example, a storage module including a music player application may receive two Ethernet packets including a payload for a song from a cloud server. Each Ethernet packet may be a copy of one another (e.g., they each contain the same song payload). The storage module may determine that one of the Ethernet packets was received before the other and the storage module may identify that both Ethernet packets contain the same information. The storage module may delete the Ethernet packet that was received second (e.g., the second duplicate package) and push the Ethernet packet that was received first (e.g., the first duplicate package) to the music player application. In some embodiments, the storage module may include an RCNA that may include and LRE configured to perform the functions aforementioned (e.g., the LRE housed by the RCNA may be used by the storage module to determine which Ethernet packet was received first and delete the second Ethernet packet).

Figure 2:
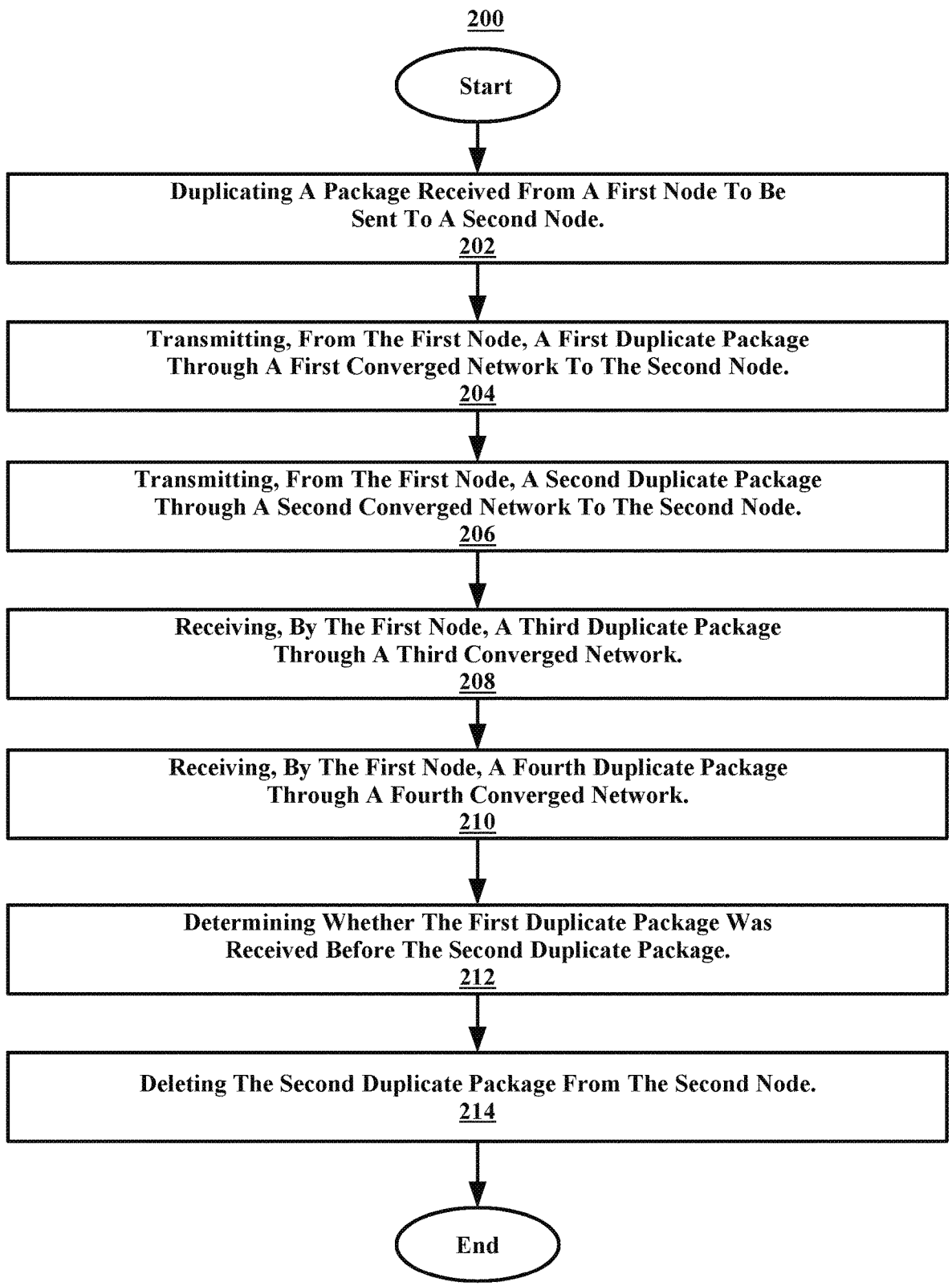
FIG. 2 illustrates a flowchart of an example operation performed by a Redundant Converged Network Adapter (RCNA) for transmitting and receiving redundant packages from two or more converged networks, in accordance with embodiments of the present disclosure.

Referring now to FIG. 2, which illustrates a flowchart of an example method 200 performed by a Redundant Converged Network Adapter (RCNA) for transmitting and receiving redundant packages from two or more converged networks, in accordance with embodiments of the present disclosure. In some embodiments, a computer system may perform one or more operations in the method 200. In some embodiments, a user may perform one or more operations in the method 200. In some embodiments, a processor may perform one or more operations in the method 200 in response to user input. In some embodiments, the method 200 may begin at operation 202 where the RCNA may duplicate a package received from a first node to be sent to a second node. In some embodiments, the package is duplicated into a first duplicate package and a second duplicate package. In some embodiments, an LRE of the RCNA may perform the one or more operations of method 200.

After duplicating the package received from a first node to be sent to a second node at operation 202, the method 200 may proceed to operation 204. At operation 204, the RCNA may transmit, from the first node, a first duplicate package through a first converged network to the second node. After transmitting the first duplicate package at operation 204, the method 200 may proceed to operation 206. At operation 206, the RCNA may transmit, from the first node, a second duplicate package through a second converged network to the second node.

After transmitting the second duplicate package at operation 206, the method 200 may proceed to operation 208. At operation 208, the RCNA may receive, by the first node, a third duplicate package through a third converged network. After receiving a third duplicate package at operation 208, the method 200 may proceed to operation 210. At operation 210, the RCNA may receive, by the first node, a fourth duplicate package through a fourth converged network. In some embodiments, operations 208 and 210 may be done separately from method 200 (e.g., the method 200 may not sequentially perform operations 208 and 210 after operations 204 and 206 and/or may separately perform the operations 208 and 210 in lieu of operations 204 and 206 at a different time). In some embodiments, operations 208 and 210 may be performed before operations 204 and 206.

After receiving a fourth duplicate package at operation 210, the method 210 may proceed to operation 212. At operation 212, the RCNA may determine whether the first duplicate package was received before the second duplicate package. After determining whether the first duplicate package was received before the second duplicate package at operation 212, the method 200 may proceed to operation 214. At operation 214, the RCNA may delete the second duplicate package from the second node.

For example, an RCNA may receive an Ethernet packet from a storage module (e.g., first node) to be sent to a server (e.g., second node). The RCNA may duplicate the Ethernet packet into a first Ethernet packet copy (e.g., first duplicate package) and a second Ethernet packet copy (e.g., second duplicate package). The RCNA may transmit, from the storage module, the first Ethernet packet copy through a first converged network physically connected through the RCNA to both the storage module and the server. The RCNA may also transmit, from the storage module, the second Ethernet packet copy through a second converged network physically connected through the RCNA to both the storage module and the server.

The RCNA, using a program contained in the server, may generate a confirmation report that may indicate that the first and second Ethernet packet copies were both received by the server. The RCNA may duplicate the confirmation report into a first confirmation report (e.g., third duplicate package) and a second confirmation report (e.g., fourth duplicate package). Through the RCNA, the sever may send the first and second confirmation reports to the storage module.

The storage module may receive the first confirmation report through a third converged network physically connected through the RCNA to both the storage module and the server. The storage module may also receive the second confirmation report through a fourth converged network physically connected through the RCNA to both the storage module and the server. In some embodiments, the RCNA may determine that the first confirmation report was received before the second confirmation report and delete the second confirmation report.

The RCNA, using a program in the storage module, may open the first confirmation report and determine, from the first confirmation report, that the first Ethernet packet copy was received before the second Ethernet packet copy. The RCNA may delete the second Ethernet packet copy from the server. In some embodiments, the RCNA may delete the one or both of the confirmation reports after analyzing the data in the confirmation report(s). In some embodiments, the converged networks aforementioned may be the same or substantially the same converged networks. In some embodiments, the method 200 may be performed with zero time recovery due to the redundancy of packages. This may be because the operations are performed on a low abstraction layer (e.g., physical layer, data link layer) and the operations are transparent to high abstraction layers (e.g., application layers, etc.

Figure 3:
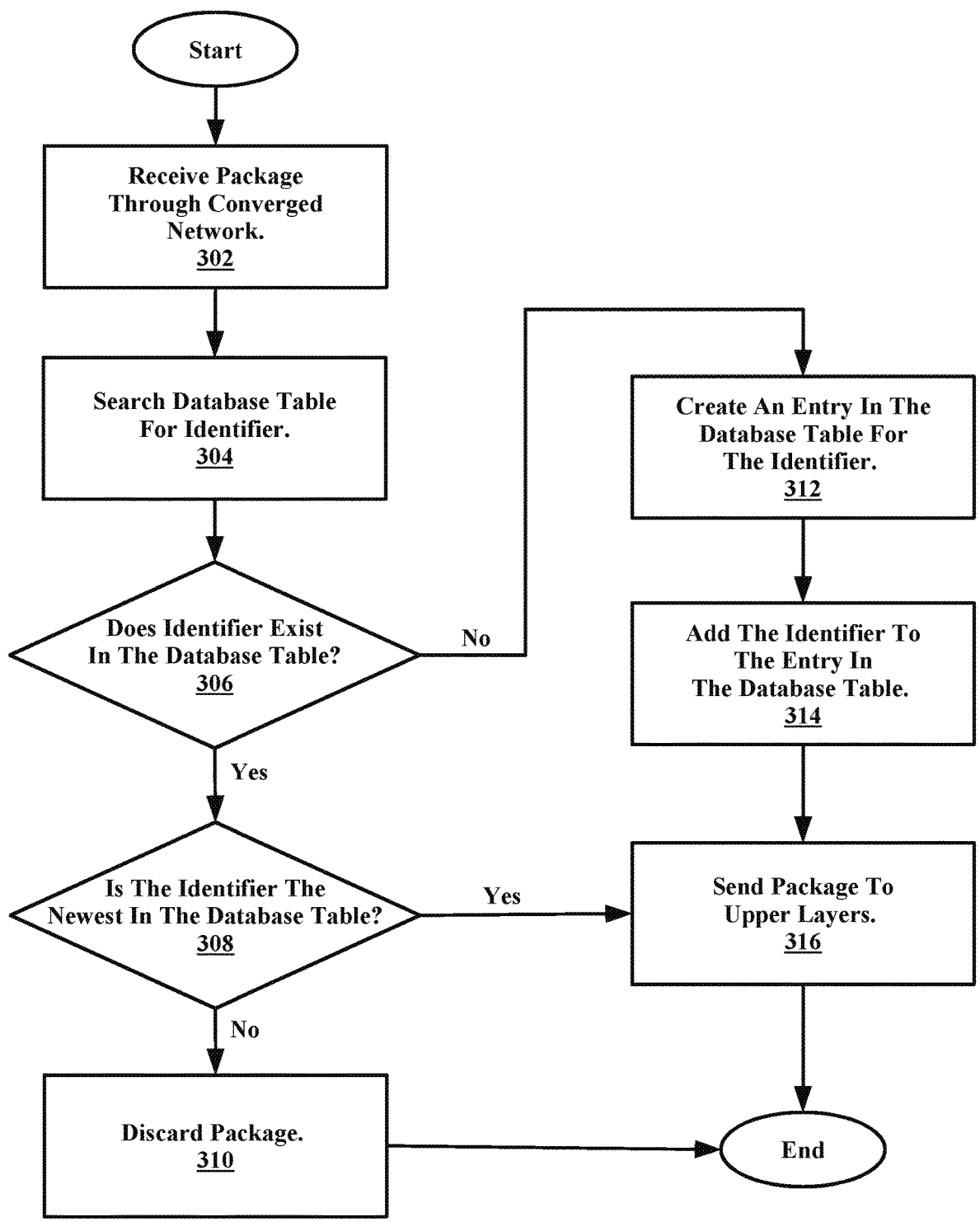
FIG. 3 illustrates a flowchart of an example method for determining whether a package is redundant, in accordance with embodiments of the present disclosure.

Referring now to FIG. 3, which illustrates a flowchart of an example method 300 for determining whether a package is redundant, in accordance with embodiments of the present disclosure. An RCNA may perform one or more operations in the method 300. In some embodiments, an LRE included in the RCNA may perform one or more operations of the method 300. In some embodiments, a computer system may perform one or more operations in the method 300. In some embodiments, a user may perform one or more operations in the method 300. In some embodiments, the processor may perform one or more operations in the method 300 in response to user input. In some embodiments, the method 300 may begin at operation 302 where a package is received through a converged network. In some embodiments, a second node may be physically connected to the converged network and may receive the package. In some embodiments, the package may be received through any converged network in the two or more converged networks.

After receiving a package through the converged network at operation 302, the method 300 may proceed to operation 304. At operation 304, the RCNA may search a database table for an identifier. In some embodiments, the identifier may be associated to the particular package received from the converged network. For example, the received package may be received with an identifier, "0123," and the RCNA may search a database table for the identifier, "0123." In some embodiments, the RCNA may use a timer to check the package received with the database table at a periodic time after reception of the package (e.g., the RCNA waits 1 second after receiving the package to check the database table).

After searching the database table for the identifier at operation 304, the RCNA may proceed to decision block 306. At decision block 306, the RCNA may determine whether the identifier exists in the database table. If at decision block 306 the RCNA determines that the identifier already exists in the database table, the method 300 may proceed to decision block 308.

At decision block 308, the RCNA may determine whether the identifier is the newest identifier in the database table. If at decision block 308 the RCNA determines that the identifier is not the newest identifier in the database table, the method 300 may proceed to operation 310, where the RCNA may discard the package. Following the above example, the RCNA may determine that "0123" is already in the database table. The RCNA may then determine that the received package associated with "0123" is not the newest identifier in the database table (e.g., decision block 308 may be important when one converged network is initiated before another converged network and the duplicate packages aforementioned are not simultaneously transmitted; the identifier associated with the packages may be the same but the second duplicate package would be "newer" and may have updates that the first duplicate package may not). The RCNA may then discard the package associated with "0123" to avoid redundant packages clogging a computer system's memory and/or hindering the computer system's processing power.

If at decision block 308, the RCNA determines that the identifier already in the database table is the newest entry in the database table, the method 300 may proceed to operation 316. At operation 316, the RCNA may send the package to upper layers (e.g., the application layer) of the network model.

Relating back to decision block 306, if the RCNA determines that the identifier does not already exist in the database table, the method 300 may proceed to operation 312. At operation 312, the RCNA may create an entry in the database table for the identifier. After creating the entry at operation 312, the method 300 may proceed to operation 314, where the RCNA may add the identifier to the entry in the database table. In some embodiments, adding the identifier to the database table may be done in order to prevent subsequent packages associated with a particular identifier from being sent to upper layers of a computer operating system (e.g., the package is stopped at operation 306).

After adding the identifier to the entry in the database table at operation 314, the method 300 may proceed to operation 316. At operation 316, the RCNA may send the package to upper layers. For example, the RCNA may determine that identifier "11ss" does not exist in a database table. The RCNA may create an entry for "11ss" and add "11ss" to the database table. The RCNA may then send the package associated with the identifier "11ss" to the application layer of a computer operating system (e.g., the computer system may open and run the package, relaying the information in the package to a user).

Figure 4:
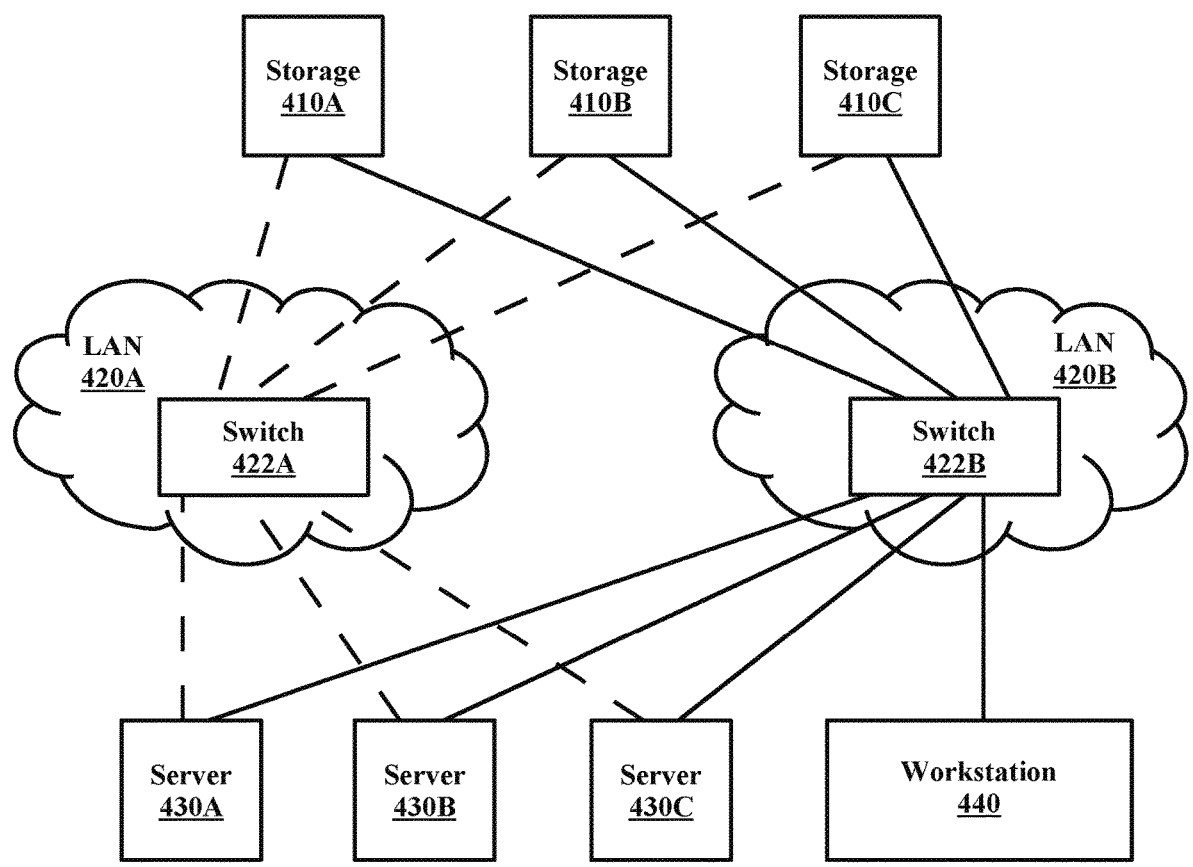
FIG. 4 illustrates a high-level block diagram of an example converged network schema with redundancy, in accordance with embodiments of the present disclosure.

Referring now to FIG. 4, which illustrates a high-level block diagram of an example converged network schema 400 with redundancy, in accordance with embodiments of the present disclosure. In some embodiments, the converged network schema 400 may be a combination of two or more networks. In some embodiments, the converged network schema 400 may be a combination of two or more converged networks. In some embodiments, the converged network schema 400 may include storage modules 410A, 410B, and 410C; local area network (LAN) interfaces 420A and 420B, which may respectively include network switches 422A and 422B; servers 430A, 430B, and 430C; and workstation 440.

In some embodiments, storage modules 410A, 410B, and 410C may be physically connected to network switches 422A and 422B. Servers 430A, 430B, and 430C may additionally be physically connected to network switches 422A and 422B, and workstation 440 may be physically connected to network switch 422B. In some embodiments, LAN interfaces 420A and 420B may be separate and disjoined networks. In some embodiments, LAN interfaces 420A and 420B may be physically connected by the storage modules 410A, 410B, 410C, and the servers 430A, 430B, and 430C that are physically connected to the network switches 422A and 422B.

In some embodiments, the converged network schema 400 may be considered redundant because the storage modules 410A-C and servers 430A-C may all be connected together through the same network switches 422A and 422B. In some embodiments, a package may be duplicated and sent through two or more paths in the converged network schema 400 and reach the same second node to cause the redundancy. For example, a first duplicate package may follow the path from server 430C to network switch 422A to storage module 410A. Simultaneously, a second duplicate package may follow the path from server 430C to network switch 422B to storage module 410A. Both packages may be duplicates of one another and contain the same information and it may be redundant to keep both packages in the converged network.

In some embodiments, the workstation 440 may be equipped with an RCNA that has control logic that is configured to logically implement one communication stack for LAN interfaces 420A and 420B (e.g., LAN interfaces 420A and 420B are separate networks but are logically viewed by the storage modules 410A-C and servers 430A-C as one converged network). In some embodiments, the RCNA may include an LRE configured to perform the methods as discussed in FIGS. 1-3.

Figure 5:
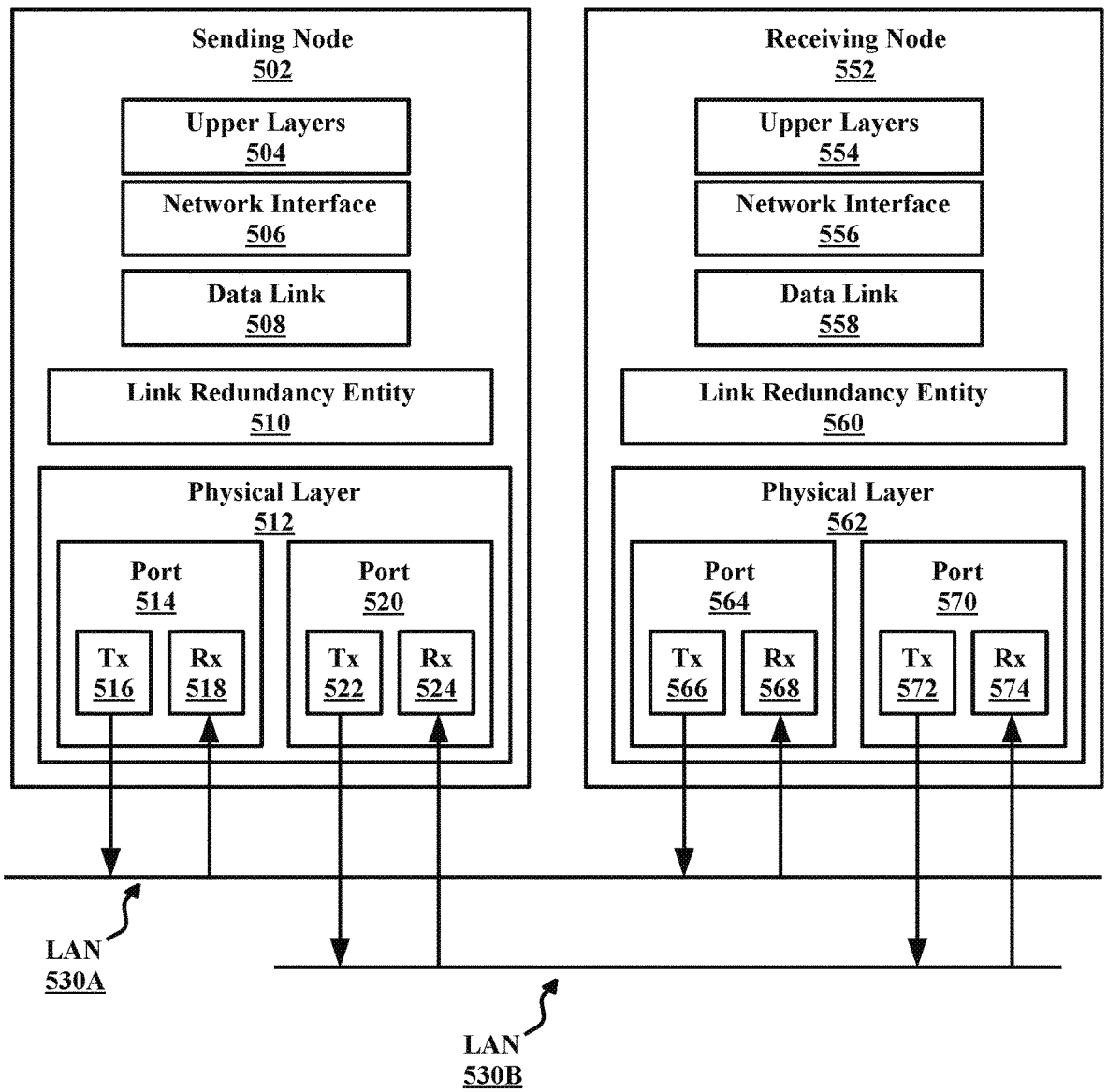
FIG. 5 illustrates a high-level block diagram of an example layer schema using a link redundancy entity in a converged network, in accordance with embodiments of the present disclosure.

Referring now to FIG. 5, which illustrates a high-level block diagram of an example layer schema 500 using a link redundancy entity (LRE) in a converged network, in accordance with embodiments of the present disclosure. In some embodiments, the layer schema 500 may include a sending node 502 (e.g., first node) that may include upper layers 504, network interface 506, data link 508, LRE 510, and physical layer 512. In some embodiments, physical layer 512 may include physical ports 514 and 520; physical port 514 may include a transmit port 516 and a receive port 518. Physical port 520 may include a transmit port 522 and a receive port 524.

In some embodiments, the layer schema 500 may also include a receiving port (e.g., second node) 552 that may include upper layers 554, network interface 556, data link 558, LRE 560, and physical layer 562. In some embodiments, physical layer 562 may include physical ports 564 and 570; physical port 564 may include a transmit port 566 and a receive port 568. Physical port 570 may include a transmit port 572 and a receive port 574.

In some embodiments, the LRE 510 may be physically connected (e.g., on the physical layer 512) to transmit ports 516 and 522. In some embodiments, the LRE 560 may be physically connected (e.g., on the physical layer 562) to receiving ports 568 and 574. In some embodiments, transmit port 516 may be connected to receive node 568 and receive node 518 may be connected to transmit port 566 via local area network (LAN) 530 (e.g., first network). In some embodiments, transmit port 522 may be connected to receive node 574 and receive node 568 may be connected to transmit port 572 via LAN 340 (e.g., the second network).

In some embodiments, the LREs 510 and 560 may logically display LANs 530A and 530B as one communication stack to a computer system (e.g., LANs 530A and 530B are logically seen by the computer system as one converged network). In some embodiments, the LREs 510 and 560 may be components of one or more redundancy converged network adapters (RCNAs), which may be specially made apparatuses that may be attached to nodes in the converged network. In some embodiments, LRE 510 and physical layer 512 including ports 514 and 520 may, together, be called an RCNA. In some embodiments, LRE 560 and physical layer 562 including ports 564 and 570 may, together, (also) be called an RCNA.

For example, a server (e.g., sending node, first node, second node, end node, etc.) may be link to storages (e.g., receiving ports, first nodes, second nodes, etc.). The server and storages may be physically connected to an RCNA with two ports by using one or more Ethernet cables. Each port from the RCNA in the server may be connected to a port in the storages and house a disjoined, separate LAN. The RCNA in the link redundancy entities in the server and storages may logically combine each LAN into a single converged network via a Fibre Channel over Ethernet (e.g., package information and network data are both sent through the same Ethernet cable).

Packages sent from the server may then be duplicated one or more times and sent to the storage(s) simultaneously (e.g., or as close to simultaneous as possible, within a range of 1 picosecond, within a range of 1 nanosecond, etc.). The RCNA may then determine if both packages arrived, indicating that there is no physical distress in the converged network (e.g., no hardware component, Ethernet cable, etc. are damaged). The RCNA may additionally delete one or more of the duplicate packages before sending one of the duplicate packages to the upper layers of the storage(s). Since the determinations are logically made on a lower layer (e.g., physical layer, data layer, etc.), there may be zero time recovery for a computer system housing the layer schema 500 to assess the redundancy and deletion of duplicate packages.

Figure 6:
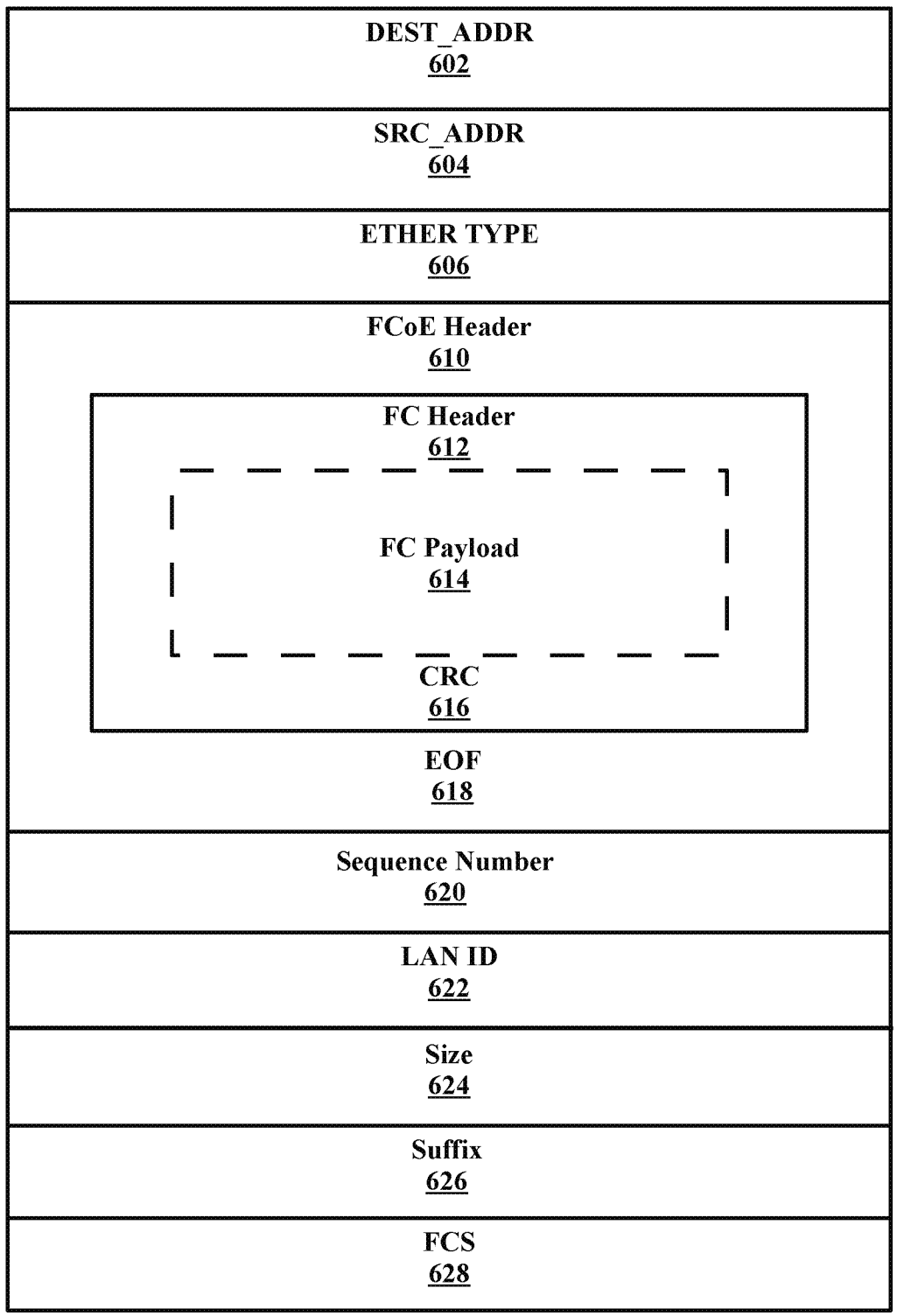
FIG. 6 illustrates a high-level block diagram of an example package format for a redundant Fibre Channel over Ethernet (FCoE) frame, in accordance with embodiments of the present disclosure.

Referring now to FIG. 6, illustrated is a high-level block diagram of an example package format 600 for a redundant Fibre Channel over Ethernet (FCoE) frame, in accordance with embodiments of the present disclosure. In some embodiments, the package format 600 may include a destination address 602, a source address 604, ether type 606, and a FCoE header 610, which may include a fibre channel (FC) header 612, a fibre channel (FC) payload 614, a cyclic redundancy code (CRC) 616, and an end of Ethernet packets (EOF) 618. In some embodiments, the package format 600 may also include a sequence number 620, a LAN ID 622, a size 624 of the package, a suffix 626, and a frame check sequence (FCS) 628.

In some embodiments, the size 624 may include the FCoE header 610, FC header 612, FC payload 614, CRC 616, EOF 618, sequence number 620, LAN ID 622, size 624, and suffix 626. In some embodiments, the FCoE header 610, FC header 612, FC payload 614, CRC 616, and EOF 618 may be referred to as link service data unit (LSDU). In some embodiments, the sequence number 620, LAN ID 622, Size 624, and suffix 626 may be referred to as a redundant control trailer (RCT).

In some embodiments, the RCT may contain 6 bytes of information. The suffix 626 may be used to identify a redundant package in a link redundancy entity and take up 2 bytes. The size 624 may represent the total size of the information of the Ethernet package and take up 12 bits. The LAN ID 622 may identify the interface in which the package was sent and take up 4 bits. The sequence number 620 may be a number that is incremented for each package sent to a specific destination address 602 and may take up 2 bytes. In some embodiments, each destination address may have a specific sequence number 620 generated during the process of sending a redundant package from a first node to a second node through a converged network. In some embodiments, the RCT may be added after the LSDU.

In some embodiments, the RCT may be the same as or substantially similar to an identifier. For example, a first node may send a package to a second node. Before sending the package, a redundant converged network adapter (RCNA) may determine that the package should be redundant. The RCNA may generate an identifier (e.g., RCT) that designates the package as redundant. The RCNA may tag the package with the identifier and proceed to duplicate the package with the identifier into a first and second duplicate package. The RCNA may then send the first duplicate package through a first converged network to the second node and the second duplicate package through a second converged network. The identifier may be used to identify the first and second duplicate packages as copies and redundant.

In some embodiments, the RCT may be completely ignored by upper layers (e.g., of an OSI model) protocols because the upper layers may only handle the LSDU contents. That is, there may be zero time recovery due to the redundant packages because upper layers may not have to process the redundancy. In some embodiments, the maximum size of the package format 600 may be less than 2500 bytes.

Figure 7:
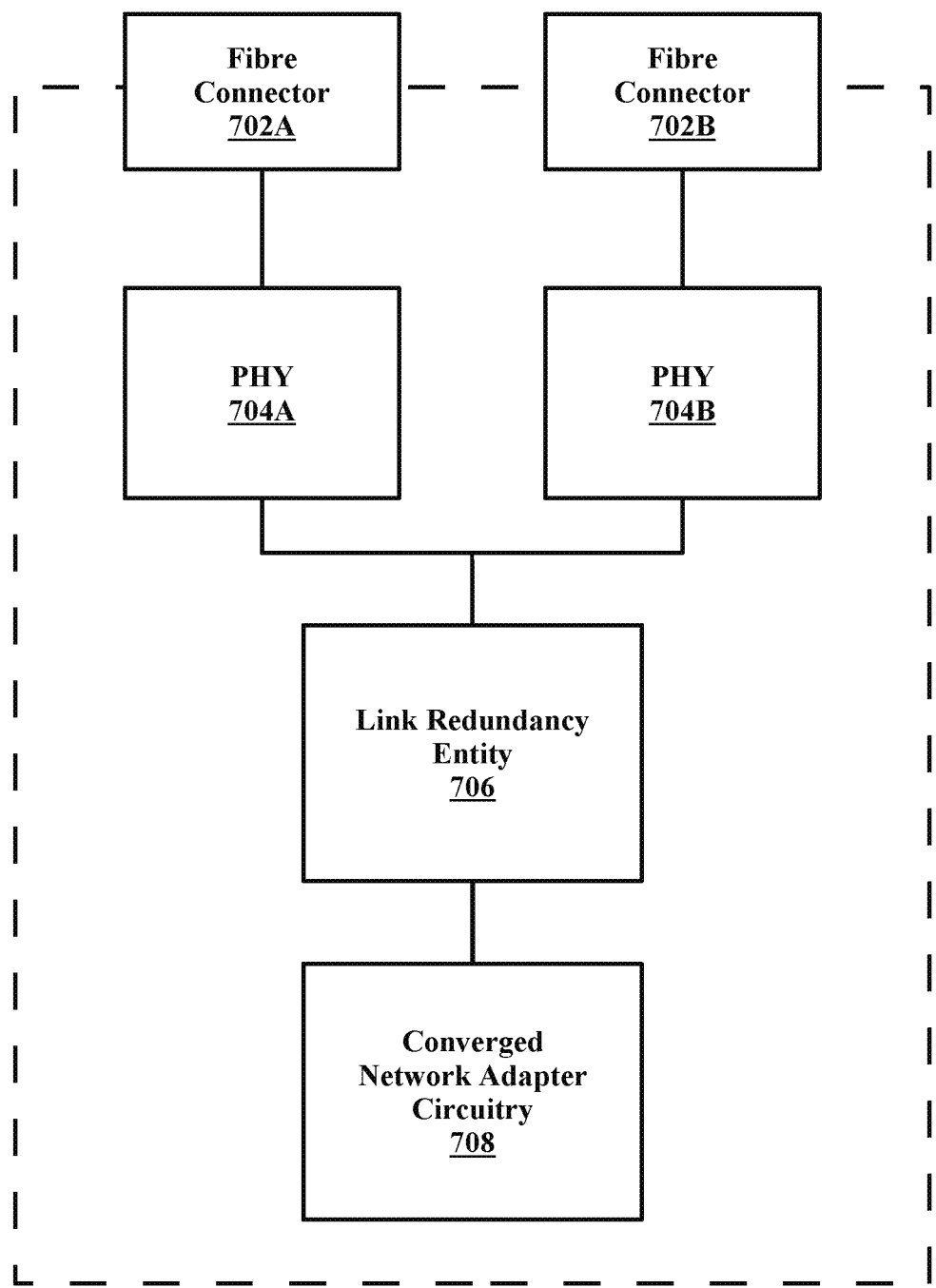
FIG. 7 illustrates a high-level block diagram of a redundant converged network adapter, in accordance with embodiments of the present disclosure.

Referring now to FIG. 7, illustrated is a high-level block diagram of a redundant converged network adapter (RCNA) 700, in accordance with embodiments of the present disclosure. In some embodiments, the RCNA 700 may include two fibre connectors 702A and 702B, two PHY chips 704A and 704B, a link redundancy entity (LRE) 706, and converged network adapter circuitry 708. In some embodiments, the PHY chips are equivalent to a physical layer of an OSI model.

In some embodiments, the two fibre connectors 702A and 702B may be used to connect two disjoined networks (e.g., LANs, WANs, SANs, etc.). In some embodiments, the fibre connectors 702A and 702B may be connected to the two PHY chips 704A and 704B to decode/encode a signal from/to an optical transceiver. In some embodiments, the two PHY chips 704A and 704B may be connected to a physical element this may be responsible for implementing the behavior of the LRE 706. In some embodiments, the LRE 706 may be a field programmable gate array (FPGA) or an application specific integrated circuit (ASIC). A FPGA or ASIC may be used due to the deterministic behavior of the RCNA 700.

In some embodiments, the LRE 706 may be connected to converged network adapter circuitry 708. In some embodiments, the LRE 706 may be connected to a media access controller (MAC). In some embodiments, the LRE 706 may be responsible for the replication of packages. In some embodiments, the LRE 706 may be responsible for the generation of a database table.

For example, a first and second Ethernet packet may be received by fibre connectors 702A and 702B. The first Ethernet packet may be decoded by PHY chip 704A and the second Ethernet packet may be decoded by PHY chip 704B. Both PHY chips 704A and 704B may simultaneously send the decoded first and second Ethernet packets to LRE 706. LRE 706 may then generate and house a database table. LRE 706 may include a timer and at a first time add the first decoded Ethernet packet to the database table. The LRE 706 may then at a second time identify, from the database table, that the second decoded Ethernet packet is the same Ethernet packet as the first Ethernet packet and delete the second Ethernet package from the system.

LRE 706 may then, using the converged network adapter circuitry 708, transmit the decoded first Ethernet packet to an application for use by a user. In some embodiments, the operations performed by the LRE 706 may be transparent to upper (e.g., application) layers. In some embodiments, the operations performed by the LRE 706 may be performed with zero time interference to the network.

Figure 8:
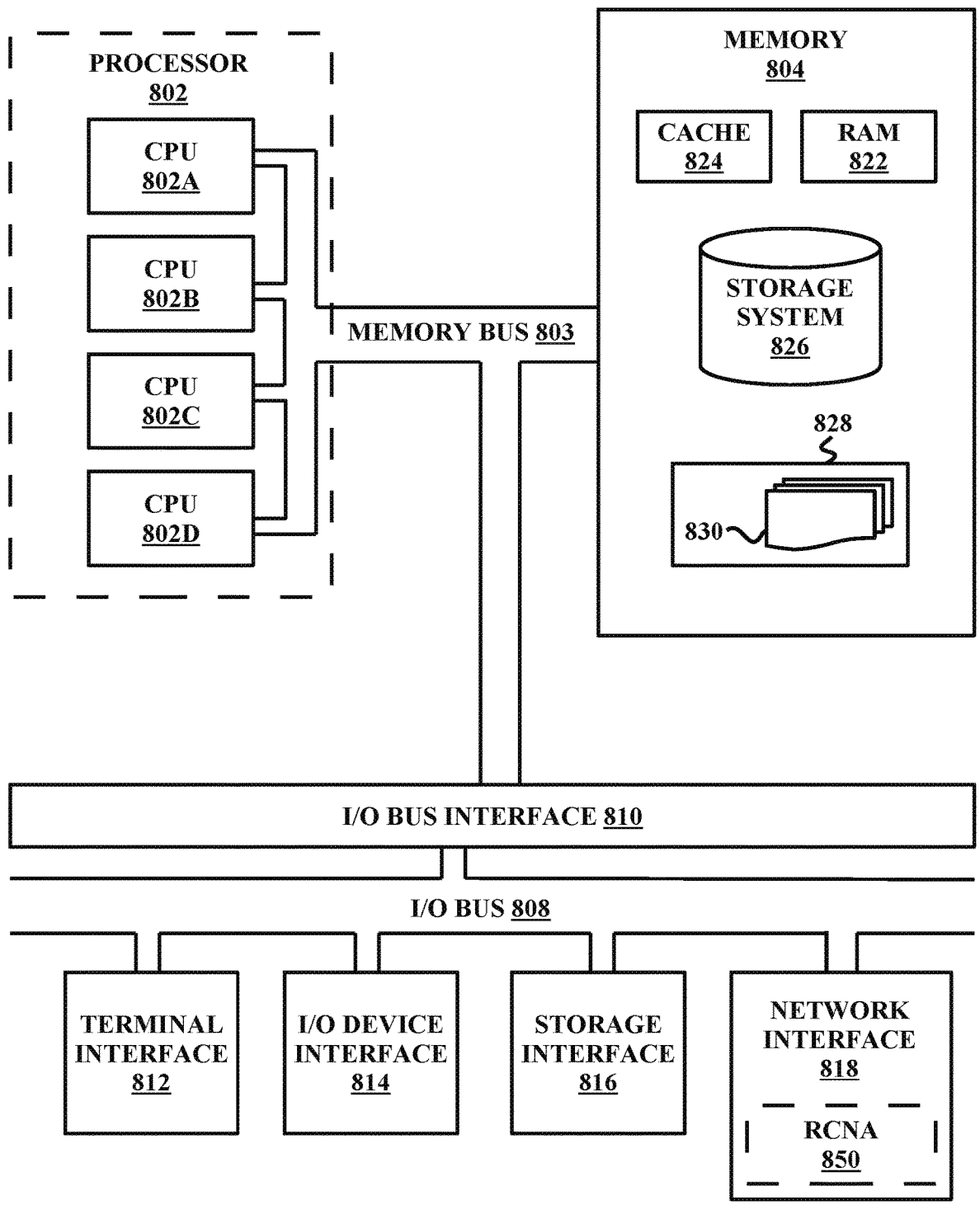
FIG. 8 illustrates a high-level block diagram of an example computer system that may be used in implementing one or more of the methods, tools, and modules, and any related functions, described herein, in accordance with embodiments of the present disclosure.

Referring now to FIG. 8, shown is a high-level block diagram of an example computer system 801 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 801 may comprise one or more CPUs 802 (also referred to as processors herein), a memory subsystem 804, a terminal interface 812, a storage interface 816, an I/O (Input/Output) device interface 814, and a network interface 818 that may include a redundant converged network adapter (RCNA) 850, all of which may be communicatively coupled, directly or indirectly, for inter-component communication via a memory bus 803, an I/O bus 808, and an I/O bus interface unit 810. In some embodiments, RCNA 850 may be a physically component (e.g., a part) of a server/storage.

The computer system 801 may contain one or more general-purpose programmable central processing units (CPUs) 802A, 802B, 802C, and 802D, herein generically referred to as the CPU 802. In some embodiments, the computer system 801 may contain multiple processors typical of a relatively large system; however, in other embodiments the computer system 801 may alternatively be a single CPU system. Each CPU 802 may execute instructions stored in the memory subsystem 804 and may include one or more levels of on-board cache.

Memory subsystem 804 may include computer system readable media in the form of volatile memory, such as random access memory (RAM) 822 or cache memory 824. Computer system 801 may further include other removable/non-removable, volatile/non-volatile computer system storage media. By way of example only, storage system 826 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 804 can include flash memory, e.g., a flash memory stick drive or a flash drive. Memory devices can be connected to memory bus 803 by one or more data media interfaces. The memory subsystem 804 may include at least one program product having a set (e.g., at least one) of program modules that are configured to carry out the functions of various embodiments.

One or more programs/utilities 828, each having at least one set of program modules 830 may be stored in memory 804. The programs/utilities 828 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 828 and/or program modules 830 generally perform the functions or methodologies of various embodiments.

Although the memory bus 803 is shown in FIG. 8 as a single bus structure providing a direct communication path among the CPUs 802, the memory subsystem 804, and the I/O bus interface 810, the memory bus 803 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 810 and the I/O bus 808 are shown as single respective units, the computer system 801 may, in some embodiments, contain multiple I/O bus interface units 810, multiple I/O buses 808, or both. Further, while multiple I/O interface units are shown, which separate the I/O bus 808 from various communications paths running to the various I/O devices, in other embodiments some or all of the I/O devices may be connected directly to one or more system I/O buses.

In some embodiments, the computer system 801 may be a multi-user mainframe computer system, a single-user system, or a server computer or similar device that has little or no direct user interface, but receives requests from other computer systems (clients). Further, in some embodiments, the computer system 801 may be implemented as a desktop computer, portable computer, laptop or notebook computer, tablet computer, pocket computer, telephone, smart phone, network switches or routers, or any other appropriate type of electronic device.

It is noted that FIG. 8 is intended to depict the representative major components of an exemplary computer system 801. In some embodiments, however, individual components may have greater or lesser complexity than as represented in FIG. 8, components other than or in addition to those shown in FIG. 8 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A computer-implemented method comprising:
   receiving, at a second node via a first node, a first duplicate package through a converged network, wherein the first node includes a first link redundancy entity and the second node includes a second link redundancy entity, and wherein the first link redundancy entity and the second link redundancy entity are a part of a physical layer;
   receiving, at the second node, a second duplicate package;
   determining, by the second link redundancy entity, that the first duplicate package was received before the second duplicate package;
   deleting the second duplicate package from the second node, wherein the determination of the first duplicate package being received before the second duplicate package and the deletion of the second duplicate package occur with a zero time recovery as allowed by the first link redundancy entity and the second link redundancy entity being a part of the physical layer; and
   sending the first duplicate package to an application.

2. The method of claim 1, wherein the second duplicate package is a copy of the first duplicate package, and wherein the method further comprises:
   generating a database table;
   adding, at a first time, the first duplicate package identified at the first time to the database table;
   identifying, at a second time, that the first duplicate package is in the database table; and
   deleting, at the second time, the second duplicate package.

3. The method of claim 1, wherein a fourth duplicate package is a copy of a third duplicate package, and wherein the method further comprises:
   generating a database table;
   adding, at a third time, the third duplicate package received by the second node to the database table;
   identifying, at a fourth time, that the fourth duplicate package was not received by the second node; and
   alerting a user to an error in a physical component of the converged network.

4. The method of claim 3, further comprising:
   generating a confirmation package, wherein the confirmation package includes a confirmation report indicating whether or not both the third duplicate package and fourth duplicate package were received by the second node;
   duplicating the confirmation package into a fifth duplicate package and a sixth duplicate package;
   transmitting, from the second node, the fifth duplicate package to the first node; and
   transmitting, from the second node, the sixth duplicate package to the first node.

5. The method of claim 4, wherein transmitting the fifth duplicate package and the sixth duplicate package is done by a redundant converged network adapter (RCNA) configured to logically implement one communication stack for the converged network.

6. The method of claim 5, further comprising:
   identifying in the confirmation report that fourth duplicate package did not reach the second node; and
   alerting a user to an error in a physical component of the converged network.

7. The method of claim 5, further comprising:
   receiving, at the first node via the second node, the fifth duplicate package;
   receiving, at the first node, the sixth duplicate package;
   determining that the fifth duplicate package was received before the sixth duplicate package;
   deleting the sixth duplicate package from the first node; and
   sending the fifth duplicate package to an application.

8. A redundancy converged network adapter (RCNA) configured to perform operations comprising:
   duplicating a package received from a first node to be sent to a second node, wherein the first node includes a first link redundancy entity and the second node includes a second link redundancy entity, and wherein the first link redundancy entity and the second link redundancy entity are a part of a physical layer;
   transmitting, from the first node, a first duplicate package through a converged network to the second node;
   transmitting, from the first node, a second duplicate package to the second node;
   determining, by the second link redundancy entity, that the first duplicate package was received before the second duplicate package; and
   deleting the second duplicate package from the second node, wherein the determination of the first duplicate package being received before the second duplicate package and the deletion of the second duplicate package occur with a zero time recovery as allowed by the first link redundancy entity and the second link redundancy entity being a part of the physical layer.

9. The RCNA of claim 8, wherein the RCNA includes control logic configured to logically implement one communication stack for two or more converged networks.

10. The RCNA of claim 8, wherein duplicating the package received from the first node further comprises:
generating an identifier for the package;
tagging the package with the identifier; and
duplicating the package with the identifier.

11. The RCNA of claim 8, wherein transmitting the first duplicate package and second duplicate package further comprises:
simultaneously sending the first duplicate package through the converged network and the second duplicate package through a second converged network.

12. The RCNA of claim 8, wherein the first node receives a third duplicate package and a fourth duplicate package, wherein the third duplicate package and the fourth duplicate package are copies of a confirmation package that includes a confirmation report, and wherein determining whether the first duplicate package was received before the second duplicate package further comprises:
identifying, at a first time, that the first duplicate package was received by the second node;
identifying, at a second time, that the second duplicate package was received by the second node, wherein the second time is subsequent the first time;
comparing the first duplicate package identified at the first time to the second duplicate package identified at the second time;
generating the confirmation package with the confirmation report in the second node;
duplicating the confirmation package to generate the third duplicate package and the fourth duplicate package; and
transmitting, from the second node, the third duplicate package and the fourth duplicate package to the first node.

13. The RCNA of claim 12, wherein the second duplicate package is a copy of the first duplicate package, and wherein comparing the first duplicate package identified at the first time to the second duplicate package identified at the second time further comprises:
generating a database table;
adding, at the first time, the first duplicate package identified at the first time to the database table;
identifying, at the second time, that the first duplicate package is in the database table; and
deleting, at the second time, the second duplicate package.

14. The RCNA of claim 12 further comprising:
generating a database table;
adding to the database table, at the first time, a fifth duplicate package identified at the first time as arriving in the second node;
identifying, at the second time, that a sixth duplicate package did not arrive in the second node; and
alerting a user to an error in a physical component of the converged network.

15. A computer program product comprising a computer readable storage medium having program instructions embodied therewith, the program instructions executable by a processor to cause the processor to perform a method, the method comprising:
receiving, at a second node via a first node, a first duplicate package through a converged network, wherein the first node includes a first link redundancy entity and the second node includes a second link redundancy entity, and wherein the first link redundancy entity and the second link redundancy entity are a part of a physical layer;
receiving, at the second node, a second duplicate package;
determining, by the second link redundancy entity, that the first duplicate package was received before the second duplicate package;
deleting the second duplicate package from the second node, wherein the determination of the first duplicate package being received before the second duplicate package and the deletion of the second duplicate package occur with a zero time recovery as allowed by the first link redundancy entity and the second link redundancy entity being a part of the physical layer; and
sending the first duplicate package to an application.

16. The computer program product of claim 15, wherein the second duplicate package is a copy of the first duplicate package, and wherein the method further comprises:
generating a database table;
adding, at a first time, the first duplicate package identified at the first time to the database table;
identifying, at a second time, that the first duplicate package is in the database table; and
deleting, at the second time, the second duplicate package.

17. The computer program product of claim 15, wherein a fourth duplicate package is a copy of a third duplicate package, and wherein the method further comprises:
generating a database table;
adding, at a third time, the third duplicate package received by the second node to the database table;
identifying, at a fourth time, that the fourth duplicate package was not received by the second node; and
alerting a user to an error in a physical component of the converged network.

18. The computer program product of claim 17, further comprising:
generating a confirmation package, wherein the confirmation package includes a confirmation report indicating whether or not both the third duplicate package and fourth duplicate package were received by the second node;
duplicating the confirmation package into a fifth duplicate package and a sixth duplicate package;
transmitting, from the second node, the fifth duplicate package to the first node; and
transmitting, from the second node, the sixth duplicate package to the first node.

19. The computer program product of claim 18, wherein transmitting the fifth duplicate package and the sixth duplicate package is done by a redundant converged network adapter (RCNA) configured to logically implement one communication stack for the converged network.

20. The computer program product of claim 19, further comprising:
identifying in the confirmation report that fourth duplicate package did not reach the second node;
alerting a user to an error in a physical component of the converged network;
receiving, at the first node via the second node, the fifth duplicate package;
receiving, at the first node, the sixth duplicate package through the sixth converged network;

determining that the fifth duplicate package was received before the sixth duplicate package;
deleting the sixth duplicate package from the first node; and
sending the fifth duplicate package to an application.

* * * * *